INVENTOR
ALBERT McCABE

Nov. 1, 1955    A. McCABE    2,722,305
SECTIONAL ARTICLE INFEED CONVEYOR
Filed April 12, 1949    2 Sheets-Sheet 2
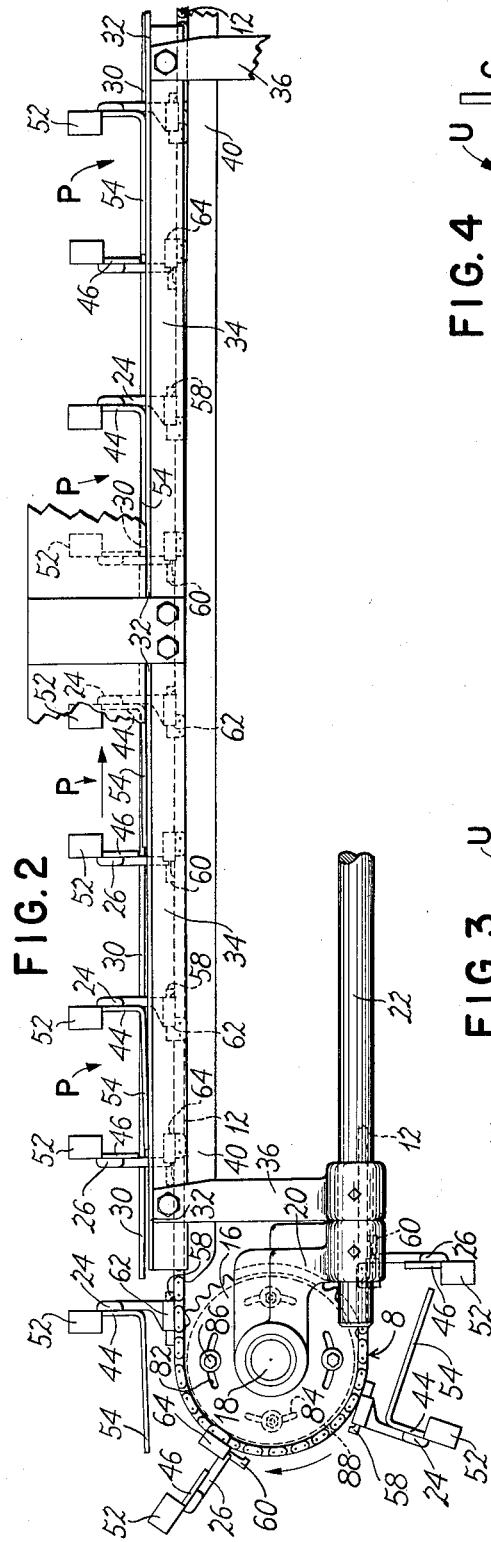
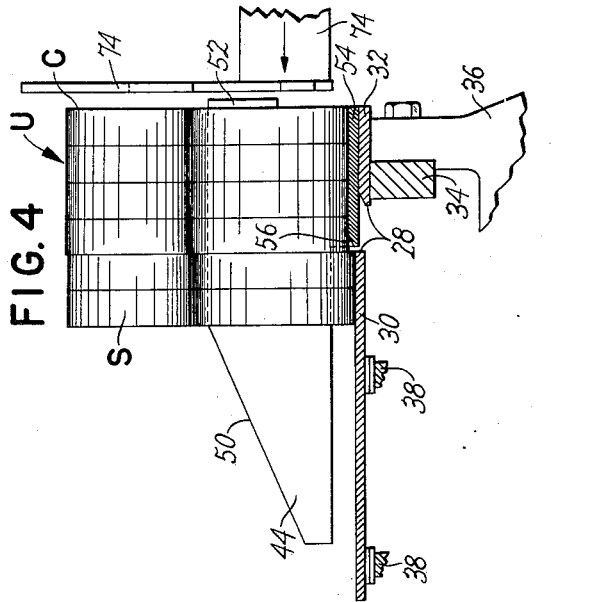
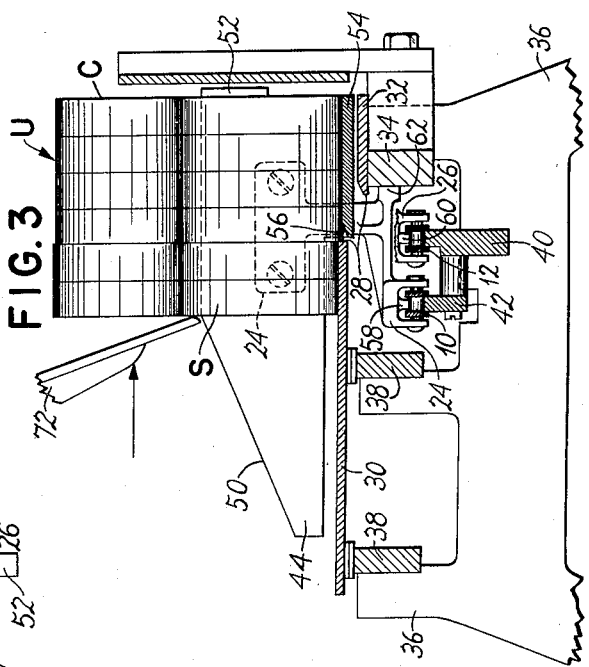
INVENTOR
ALBERT McCABE
BY
Wentworth B. Clapham
ATTORNEY

United States Patent Office 2,722,305
Patented Nov. 1, 1955

2,722,305

SECTIONAL ARTICLE INFEED CONVEYOR

Albert McCabe, Brooklyn, N. Y., assignor to American Machine & Foundry Company, a corporation of New Jersey Application April 12, 1949, Serial No. 86,893

11 Claims. (Cl. 198—24)

This invention relates to wrapping machines, and more particularly to a method of and mechanism for feeding articles, such as loaves of bread or cake, or sections of loaves of bread or cake, into a wrapping machine and locating them in position for introduction into the wrapping units of the machine. According to the invention, articles to be wrapped are fed in succession to an article infeed station where they are delivered one by one to a transverse conveyor by which they are moved into the machine in a direction substantially at right angles to the path of movement of each loaf or loaf section prior to being delivered to the transverse conveyor.

In handling articles to be wrapped, such for instance as loaves of sliced bread from which the crust ends or "heels" have been removed, or sections of loaves of sliced bread or cake, it is desirable to insure that at all times the slices are properly arranged and do not slip sidewise relative to each other. This problem becomes more serious when sliced loaves of bread, or sections of sliced loaves of bread, hereinafter designated "loaf units," are introduced into a wrapping machine in such a manner that, when wrapped, the end folds of the wrapper enclosing each loaf, lie adjacent the sides of wrapped loaves, or the exposed crumb faces in the case of loaf units.

The present invention is directed primarily towards solution of the problem involved in properly handling and delivering loaves and loaf units such that the end folds will lie adjacent the sides of each loaf unit, and the crumb ends thereof will be visible through an unbroken expanse of wrapper, especially in wrappers of cellophane and the like, which are transparent. In order to accomplish this type of wrapping, it is necessary to introduce each loaf unit into the machine in such a manner that the crumb end of each loaf unit is moved first into the wrapping machine. This involves a positioning of each unit in such a way that the sides thereof lie in a plane which is perpendicular to the ptah of movement of each loaf unit into the wrapping machine.

In order to insure that the several slices of each loaf or loaf unit will at all times remain in proper relationship relative to each other, the invention consists in the provision of means which prevent any of the slices from being displaced laterally or slipping out of their normal loaf slice stack relationship with adjacent slices. In this way, each loaf or loaf unit introduced into the wrapping machine and wrapped therein is at all times positively controlled and extremely uniform, and pleasing appearing packages are obtained.

The invention consists in the provision of improved article infeed mechanism for a wrapping machine provided with means for supporting articles to be wrapped in such manner that each article is positively controlled from the time it enters the infeed conveying mechanism until it is discharged therefrom into the wrapping mechanisms of the wrapping machine.

It is a further object of the invention to provide novel infeed mechanism for a wrapping machine in which the sides of an article, for example a bakery product, such as a sliced loaf of bread or cake with crusts removed, or a loaf unit comprising a plurality of slices of bread or cake, are held and the bottom is also supported during the movement of the article into the wrapping machine and until it is removed from the conveying mechanism.

The invention also consists in the provision of an improved infeed conveying device having a plurality of spaced pockets into which a sliced loaf of bread, or a loaf unit consisting of a plurality of slices of bread, are delivered and supported against relative shifting movement of the slices of each loaf or unit during its delivery into a wrapping machine for enwrapment in a wrapper.

The invention also consists in the novel method of so handling articles to be wrapped, for example bakery products, such as sliced loaves of bread or cake with crusts removed, or loaf units of sliced bread or cake, that they are maintained in proper slice stack relationship from the time they are received in an infeed conveyor until they are discharged therefrom into the wrapping instrumentalities of the wrapping machine.

With these and other objects not mentioned in view, the invention consists in certain combinations and constructions which will be hereinafter fully described, and then set forth in the claims hereunto appended.

In the accompanying drawings, which form a part of this specification, and in which like characters of reference indicate the same or like parts:

Figure 2 is a rear view of the article infeed conveyor;

Figure 3 is a sectional end elevation of the article infeed conveyor illustrating the position of a flight at the article receiving station; and Figure 4 is also a sectional end elevation of the article infeed conveyor illustrating the position of a flight at the article ejecting station.

Figure 1:
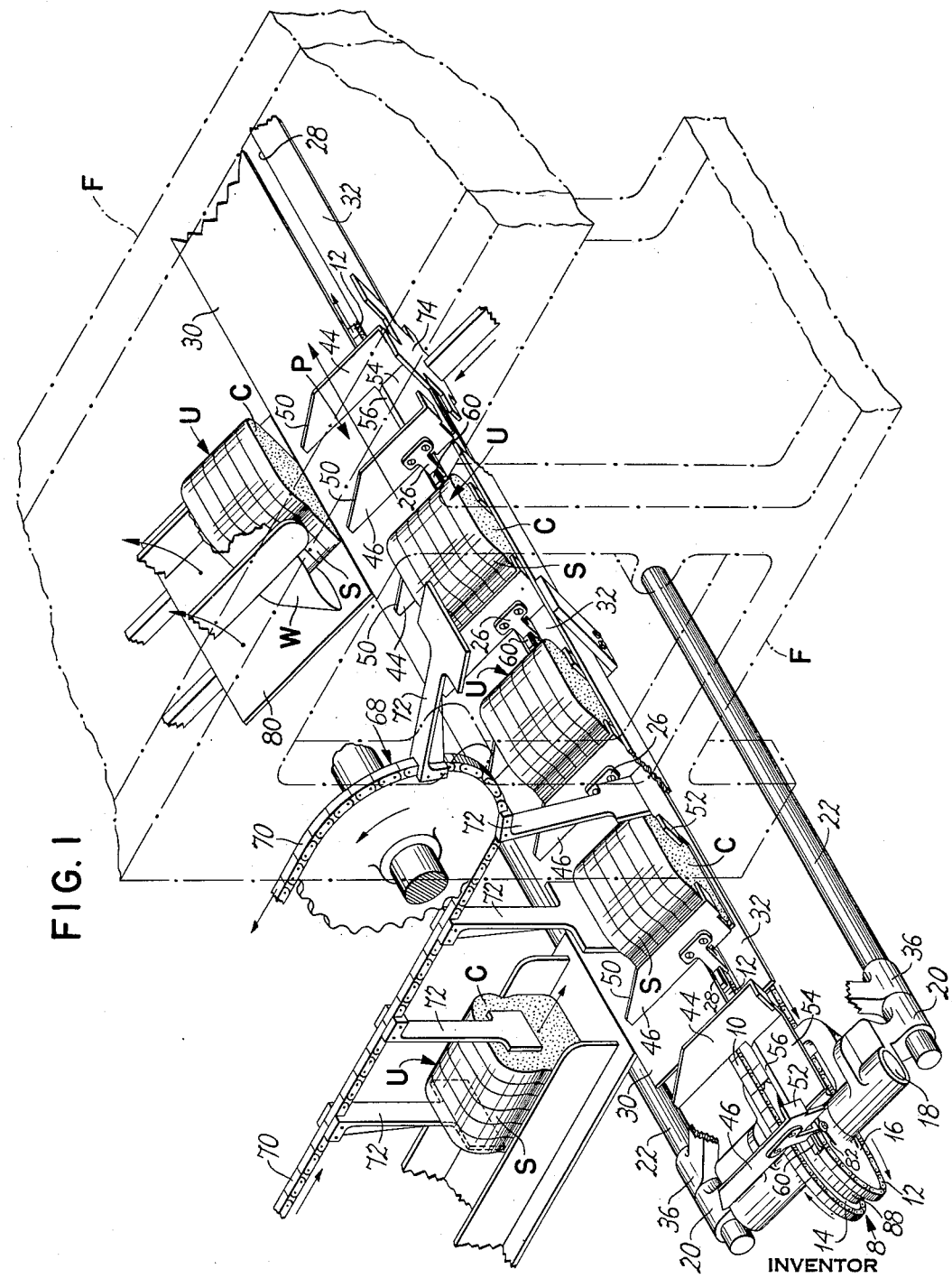
Figure 1 is an isometric view illustrating the article infeed conveyor in conjunction with an article supply conveyor and article ejecting mechanism.

Referring to the drawings, the article infeed conveyor consists of a pair of adjacent parallel endless chains 10 and 12 which are driven intermittently in synchronism with the several mechanisms of the wrapping machine from the main drive of the wrapping machine, the frame of which is designated generally F (Figure 1). Chains 10 and 12, run on suitable idler sprockets 14 and 16, respectively, loosely mounted on shaft 18 supported at its ends in a bracket 20 attached to spaced parallel supporting rods 22 projecting from and held by the wrapping machine frame F. Chains 10 and 12 are provided with a plurality of equally spaced lugs 24 and 26, respectively. Lugs 24 are mounted equidistantly along chain 12; lugs 26 are mounted equidistantly along chain 10. These lugs extend upwardly from chains 10 and 12 through a slot 28 formed by an elongated bottom plate 30 and a conveyor bottom rail 32 spaced therefrom and parallel thereto. Rail 32 is secured to a bar 34 held by suitable frame brackets 36 mounted on rods 22. Plate 30 is secured to a pair of elongated bars 38 also suitably mounted on frame brackets 36. In order to prevent chains 10 and 12 from sagging, the upper lap of chain 12 is supported by an elongated guide bar 40, and the upper lap of chain 10 rides along guide bar 42 suitably attached to bar 40 which in turn is held by frame brackets 36.

Attached to each of the lugs 24 is a leading article engaging flight 44. Supported by each of the lugs 26 is a trailing article engaging flight 46. As shown in Figures 1 and 2, the arrangement of lugs 24, 26 and flights 44 and 46 supported thereby, is such that they form a pocket P into which each article to be wrapped is inserted at an article infeed station without the wrapping machine and then conveyed to an article ejecting station within the wrapping machine. As mentioned hereinabove, the mechanism constituting the present invention is designed primarily for insuring the proper introduction into a wrapping machine of articles such as sliced loaves of bread or cake, or sliced loaf units U. The loaf units U, indicated in Figures 1, 3 and 4, contain six slices of bread. Obviously the number of slices can be varied as desired.

Since the article to be conveyed consists of sliced loaves of bread or cake, or sliced loaf units U which are inserted into and ejected from the conveyor pockets P, not leading with their side edges S, but with exposed crumb faces C, flights 44 and 46, which form pockets P, are so designed as to make the inserting, conveying and ejecting of the slices of each unit such that there will be no relative slippage between the several slices of each unit (each unit will remain as a compact loaf section) and no frictional contact with either exposed face C of a loaf or loaf unit during movement thereof from the article infeed station into the wrapping machine where they are ejected from pockets P. In the latter case, this is particularly desirable, especially in handling bakery products such as raisin bread or cake where raisins might tend to stick and pull out of the exposed crumb face, or soft crumb bread or cake where the soft crumb might tend to adhere to a back support plate or similar surface along which or with which it might be moved.

As shown in Figure 1, the entire infeed mechanism, including conveyor 8, plate 30 and rail 32, is inclined at an angle with respect to the infeed and discharge stations. In Figures 3 and 4, this angular relationship is not shown because these figures are included primarily to emphasize details of the structural relationships of the parts of the conveying mechanisms disclosed. In the illustrated embodiment in Figure 1, the inclined arrangement is provided in order to properly position each loaf or loaf unit U for delivery onto inclined lifter table 80 within the wrapping machine. Obviously, since the present invention is not limited to the particular type of wrapping machine shown in Figure 1, the infeed mechanism, including conveyor 8, plate 30, and rail 32, could be arranged in a substantially horizontal position with respect to the infeed and discharge stations if so desired, especially in a machine where the lifter table is located in a substantially horizontal plane when positioned to receive an article to be wrapped.

The front portion of the top edge of each leading and trailing flight 44, 46, preferably is provided with a bevel 50 which tends to insure trouble free insertion and ejection from conveyor pockets P. The top portion of the rear edge of each flight 44, 46 is also provided with an inward projection or ear 52 which functions to engage and support the slices facing the rear portion of each pocket P so that the slices of each loaf unit remain in their proper upright positions in the same manner in which they are inserted.

Each leading flight 44 of a pocket P is provided with a horizontal article supporting plate 54 which preferably is formed integrally with and extends rearwardly from the bottom of each flight 44 across the bottom of each pocket P towards its complementary trailing flight 46. Article supporting plate 54 performs the dual function of acting as a supporting table for a substantial portion of each loaf or loaf unit conveyed, and also as an essential bridge to prevent slices from shifting relative to each other or dropping through slot 28 in which lugs 24, 26 move during the travel of the infeed conveyor mechanism.

In order to assure a trouble free slipping action of the lower edges of the slices of each loaf unit delivered into pockets P, as they are moved onto or off article supporting plate 54, lugs 24, which carry leading flights 44, are so mounted as to permit the free end of each plate 54 to travel above the top surface of conveyor bottom rail 32. This rail is mounted somewhat inclined, or at an angle with respect to the horizontal conveyor plate 30 in such a manner that at the article inserting station where each loaf section is delivered to a pocket P, the article supporting plate 54 assumes a slightly lower level than plate 30 (Figure 3) and at the article ejecting station within the machine where each loaf section is discharged from a pocket P, each article supporting plate 54 assumes a slightly higher level than plate 30 (Figure 4). This arrangement prevents the bottom edges of the slices from being caught on the side edge of plate 30, when the slices are moved onto or off supporting plate 54 of a pocket P.

In order further to facilitate a trouble free movement of the slices of each loaf unit into and out of pockets P, it is preferred to provide the front edge of each article supporting plate 54 with a bevel 56. Lugs 24 and 26 are provided with suitable guide fingers 58 and 60, respectively, which assure a fair amount of vertical stability of flights 44 and 46 during their engagement with loaf units being wrapped. Lugs 24 and 26 are also provided with side guide members 62 and 64, respectively, which are in slidable contact with the inner side edge of bar 34 (Figure 3) and are employed for the purpose of stabilizing lugs 24 and 26.

Loaf units U are fed to article inserting station by any means. In the illustrated embodiment, this mechanism consists of an endless supply conveyor 68 comprising an endless chain 70 having attached thereto a plurality of spaced pusher arms 72. Conveyor 68 is driven intermittently and in synchronism with article infeed conveyor 8 from the main drive shaft of the wrapping machine by suitable means (not shown) in order to advance each loaf unit U, containing a predetermined number of slices, at right angles toward infeed conveyor 8 and intermittently push each unit U into an empty pocket P of infeed conveyor 8 positioned to receive it (see Figure 1).

At the article ejecting station within the wrapping machine, each loaf unit U is ejected from a pocket P by means of a reciprocating pusher arm 74, driven by suitable means (not shown) from the main drive shaft (not shown) of the wrapping machine. As each loaf unit is ejected from a pocket P, it becomes partially enwrapped in a wrapper W as it is moved onto a lifter table 80 which may be constructed and operated in a manner similar to that shown in Schmitt Patent 1,851,295.

In order to provide facilities for adjusting the lateral dimensions of pockets P, sprockets 14 and 16 may be provided with suitable slots 82 and 84, respectively, which engage with suitable adjusting screws 86 held by a disc 88 (Figure 1) in substantially the same manner as disclosed in Patent 1,843,453 issued to C. Littlefield. Disc 88 is secured to shaft 18 and adjustments are made by loosening screws 86, and shifting sprockets 14, 16 in opposite directions to adjusted positions, after which screws 86 are tightened.

With these and other objects not specifically mentioned in view, the invention consists in certain combinations and constructions which will be hereinafter fully described, and then set forth in the claims hereunto appended.

What I claim is:

1. In an apparatus of the type described, the combination with an article delivery station and an article discharge station, of a conveyor for moving an article to said delivery station, a second conveyor provided with a plurality of spaced article conveying pockets, each of said pockets comprising a leading flight, and a trailing flight spaced therefrom, spaced elongated plates located beneath said pockets, a support member having an uninterrupted article supporting surface mounted on each of said leading flights and extending rearwardly therefrom towards said trailing flight and substantially closing said slot beneath said member thereby preventing downward movement of said article through the space between said elongated plates, and coacting means on said flights to limit the movement of an article into said pockets and prevent the longitudinal movement of an article positioned thereon during the travel of said second conveyor in moving articles in said pockets to said discharge station.

2. A conveying mechanism comprising an endless conveyor, a plurality of article supporting pockets mounted substantially equidistantly along said conveyor for travel above spaced elongated plates, each of said pockets including a leading flight and a trailing flight spaced therefrom, support means mounting each of said flights positioned for travel through said space between said spaced elongated plates, and means on said flights for supporting articles positioned therein against downward movement into said space between said spaced elongated plates, and means carried by said flights for preventing movement of said articles positioned between said leading and trailing flights in a direction at right angles to the direction of movement of said conveyor.

3. The invention defined in claim 2, including mechanism for adjusting said flights of said conveyor to and from each other to accommodate different sizes of articles.

4. In a conveying mechanism for conveying slice articles from an infeed station to a discharge station within a wrapping machine, a conveyor extending between said stations, said conveyor being adapted to be driven to position empty pockets at said infeed station and filled pockets at said discharge station, sets of spaced leading and trailing flights carried by said conveyor, said flights being constructed to form said pockets for supporting and conveying said articles, means at said infeed station for positioning a sliced article in a pocket with the plane of each slice of said sliced articles located substantially at right angles to the plane of said flights, a support table carried by one of said flights of each set for maintaining said slices of said sliced articles against lateral shifting movement during the travel of said pockets from said infeed station to said discharge station, and means carried by said flights of each pocket for maintaining said sliced articles in said pockets against longitudinal movement during the travel of said pockets from said infeed to said discharge station.

5. In a mechanism for conveying sliced articles, such as sliced loaves and loaf units of bread and cake, into a wrapping machine, an infeed station, a discharge station within said machine, an endless conveyor extending between said stations adapted to be driven intermittently to position empty pockets at said infeed station and filled pockets at said discharge station, spaced flights forming said conveying pockets mounted on said conveyor, means operative at said infeed station for moving sliced loaves or loaf units into said pockets with the longitudinal axis thereof extending in the direction of said movement, and for positioning said sliced loaves or loaf units between said flights with the slices of said sliced loaf or loaf unit arranged substantially at right angles to the path of movement of said sliced loaf or loaf unit between said flights, means carried by one of said flights of each of said pockets for preventing lateral separations of said slices of said sliced loaf or loaf unit, means carried by each of said flights of said pockets for preventing further longitudinal movement of a loaf or loaf unit relative to said flights during its movement from said infeed to said discharge station, and means operative at said discharge station for ejecting said sliced loaves or loaf units from said pockets.

6. In an article conveying mechanism, the combination with an article delivery station and an article discharge station, of a conveyor moving in a direction substantially at right angles to the movement of an article to said delivery station, an elongated support plate extending along said conveyor, an elongated rail spaced from said plate and substantially parallel thereto, means for moving articles in succession to said delivery station, over said plate and onto said conveyor, a plurality of pockets mounted equidistantly along said conveyor, each of said pockets comprising a leading flight and a trailing flight spaced therefrom, an elongated article bottom support carried by one of said flights and coacting with the other to support at least a portion of an article delivered thereonto at said delivery station and during the movement of said article to said discharge station above said space between said plate and rail, means on said flights for securing an article supported by said bottom support between said leading and trailing flights against longitudinal movement, a guide surface over which articles are moved into and out of said pockets, means for positioning each of said bottom supports in a plane below the plane of said guide surface at said delivery station, means for locating each of said bottom supports in a plane above the plane of said guide surface at said discharge station, and a device for ejecting articles from said pockets at said discharge station.

7. In an article conveying mechanism, the combination with an article delivery station and an article discharge station, of a conveyor moving in a direction substantially at right angles to the movement of an article to said delivery station, an elongated article supporting plate extending along said conveyor, a second elongated plate extending along said conveyor and spaced from said first-named plate, means for moving articles in succession over said first-named plate at said delivery station and onto said conveyor, a plurality of pockets mounted equidistantly along said conveyor, each of said pockets comprising a leading flight and a trailing flight spaced therefrom, supports mounting said flights extending upwardly through said space between said plates, an elongated article bottom support carried by one of said flights of each pocket, said bottom support having a beveled front edge over which an article is moved over said first-named plate onto said bottom support at said delivery station and off of said bottom support at said discharge station, and inwardly extending complementary projections mounted on said flights coacting to maintain an article in a pocket against longitudinal movement during the travel of each article from said delivery to said discharge station.

8. In an article conveying mechanism, the combination with an article delivery station and an article discharge station, of a conveyor moving in a direction substantially at right angles to the movement of articles to said delivery station, means for moving sliced articles in succession onto said conveyor at said delivery station with said slices arranged in planes substantially parallel to the direction of movement of said conveyor, a device for ejecting articles from said conveyor at said discharge station, a plurality of pockets mounted equidistantly along said conveyor, each of said pockets comprising a leading flight and a trailing flight spaced therefrom, an elongated article bottom support carried by one of said flights of each pocket for supporting one or more slices of said sliced articles against lateral movement relative to the path of travel of said conveyor, said bottom support having a beveled front edge over which an article is moved by said means onto said bottom support at said delivery station, and by said device off of said bottom support at said discharge station, inwardly extending complementary projections mounted on said flights coacting to maintain an article in a pocket against longitudinal movement during the travel of each article from said delivery station to said discharge station, a guide surface over which articles are moved into and out of said pockets, means for positioning each of said bottom supports in a plane below the plane of said guide surface at said delivery station, and for locating each of said bottom supports in a plane above the plane of said guide surface at said discharge station.

9. In an apparatus of the type described, the combination with an article delivery station and an article discharge station, of a conveyor for moving articles from said delivery station to said discharge station, a plurality of article advancing flights mounted on said conveyor, a plate forming a guide surface over which articles consisting of a plurality of stacked elements are moved into and out of said conveyor, a plate spaced from said guide surface extending substantially parallel thereto to provide a slot in which said conveyor flights move, and a bottom support plate mounted on alternate flights and extending outwardly therefrom and above said slot for supporting articles delivered into the range of action of said flights and preventing one or more of said stacked elements of said articles from dropping into said slot during the delivery of said articles into and out of said conveyor, and during the movement of said articles by said conveyor from said delivery station to said discharge station.

10. In an apparatus of the type described, the combination with an article delivery station and an article discharge station, of a conveyor for moving articles from said delivery station to said discharge station, a plurality of article advancing flights mounted on said conveyor, a guide surface over which articles consisting of a plurality of stacked elements are moved into and out of said conveyor, a plate spaced from said guide surface extending substantially parallel thereto and coplanar therewith to provide a slot in which said conveyor flights move, a bottom support plate mounted on alternate flights for supporting articles delivered into the range of action of said flights and preventing one or more of said stacked elements of said articles from dropping into said slot during the delivery of said articles into and out of said conveyor, and during the movement of said articles by said conveyor from said delivery station to said discharge station, and inwardly extending ears at the rear of said flights coacting to hold each article, supported by said bottom support plate, against longitudinal movement relative to said flights while said articles are being advanced thereby from said delivery to said discharge station.

11. In an apparatus of the type described, the combination with an article delivery station and an article discharge station, of a conveyor for moving articles consisting of a plurality of stacked elements from said delivery station to said discharge station, a plurality of article advancing flights provided with a beveled top edge portion mounted on said conveyor, a plate forming a guide surface over which articles are moved into and out of said conveyor, a plate spaced from said guide surface extending substantially parallel thereto to provide a slot in which said conveyor flights move, a bottom support plate mounted on alternate flights for supporting one or more stacked elements of said articles delivered into the range of action of said flights and preventing one or more elements of said articles from dropping into said slot, and inwardly extending ears on each of said flights adapted to engage an end of an article and position said article between two flights.

References Cited in the file of this patent

UNITED STATES PATENTS

| | | |
|---|---|---|
| 733,558 | Schirmer | July 14, 1903 |
| 1,843,453 | Littlefield | Feb. 2, 1932 |
| 2,141,226 | Rubel et al. | Dec. 27, 1938 |
| 2,358,292 | Malhiot | Sept. 12, 1944 |
| 2,632,985 | Schmitt | Mar. 31, 1953 |